United States Patent [19]

Scharpf et al.

[11] Patent Number: 5,294,247
[45] Date of Patent: Mar. 15, 1994

[54] ADSORPTION PROCESS TO RECOVER HYDROGEN FROM LOW PRESSURE FEEDS

[75] Inventors: Eric W. Scharpf, Emmaus; Ravi Kumar, Allentown, both of Pa.

[73] Assignee: Air Products and Chemicals, Inc., Allentown, Pa.

[21] Appl. No.: 23,766

[22] Filed: Feb. 26, 1993

[51] Int. Cl.⁵ ............................................. B01D 53/04
[52] U.S. Cl. .......................................... 95/101; 95/102; 95/103; 95/130; 95/139; 95/140; 95/147
[58] Field of Search ........................ 95/98, 100–103, 95/105, 139, 140

[56]  References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 4,402,712 | 9/1983 | Benkmann | 55/26 |
| 4,589,888 | 5/1986 | Hiscock et al. | 55/26 |
| 4,650,501 | 3/1987 | Hiscock et al. | 55/26 |
| 4,684,377 | 8/1987 | Harund et al. | 55/26 |
| 4,723,966 | 2/1988 | Fuderer | 95/98 |
| 4,917,710 | 4/1990 | Harund et al. | 55/26 |
| 4,969,935 | 11/1990 | Hay | 55/26 |
| 4,981,499 | 1/1991 | Hay et al. | 55/26 |
| 5,174,796 | 12/1992 | Davis et al. | 95/100 |
| 5,203,888 | 4/1993 | Maurer | 95/101 |

FOREIGN PATENT DOCUMENTS

| | | |
|---|---|---|
| 2154465 | 10/1987 | United Kingdom . |
| 2155805 | 10/1987 | United Kingdom . |
| 2237220 | 5/1991 | United Kingdom . |

*Primary Examiner*—Robert Spitzer
*Attorney, Agent, or Firm*—Geoffrey L. Chase; James C. Simmons; William F. Marsh

[57]  ABSTRACT

The present invention is a process for recovering hydrogen from dilute refinery off gases using a vacuum swing adsorption process having a simultaneous cocurrent depressurization to provide purge gas for another bed under the influence of a vacuum and countercurrent depressurization to vent void space gas and/or adsorbed gas to ambient.

27 Claims, 8 Drawing Sheets

ADSORPTION PROCESS TO RECOVER HYDROGEN FROM LOW PRESSURE FEEDS

TECHNICAL FIELD

The present invention is directed to vacuum swing adsorptive processes for recovering hydrogen at high recoveries and high purities as an unadsorbed product from a feed gas at relatively low pressure and low hydrogen content, typically from refinery off gases.

BACKGROUND OF THE PRIOR ART

It is currently not economical to remove hydrogen from low pressure (<125 psig), low concentration streams present in oil refinery applications. The currently practiced process for using such streams is to blend them with natural gas to burn and recover the heating value from the hydrogen present. There are several current alternative methods for hydrogen generation in such a situation. Steam methane reformer generation of hydrogen has high capital and energy costs relative to the proposed process based on economic evaluation at 25 MMSCFD hydrogen production. Thus, steam methane reformer hydrogen generation applicability is limited to very large systems. Adsorption based purification of these lower pressure hydrogen streams with current technology is not effective since the resulting recoveries and product purities are extremely low. Recent adsorption process patents report only 76% recovery of only a 75% pure hydrogen product, starting with a 52% hydrogen feed.

Semipermeable membrane based purification of comparable purity low pressure feed streams would have prohibitively high compression costs, since so much of the feed is waste gas. Also, membrane based systems have very high capital costs associated with medium-to-large scale operation so they would not be suitable for the applications addressed by the current adsorption based process. Thus, there is a need for a low cost process for hydrogen recovery from low grade waste streams to meet the medium-to-large hydrogen demands in oil refineries and other similar environments.

Recent changes in environmental regulations in association with the Clean Air Act have forced liquid fuel producers to acquire more hydrogen to process crude oil into more clean burning fuel formulations. This increased hydrogen demand must be met by new sources in oil refinery and similar environments so a greater need for new methods of hydrogen purification of production now exists.

U.K. Patent 2,154,465 discloses a vacuum swing adsorption process for recovering hydrogen in waste gas obtained in petrochemical plants. The vacuum swing adsorption process described is conducted through a series of stages, including adsorption, simultaneous cocurrent depressurization to provide pressure equalization gas while countercurrently venting, providing purge to an evacuated bed, evacuation, purge under vacuum, product repressurization, and pressure equalization. The patented process has discontinuous feed, while the dual end step provides equalization gas and rejects waste. The patent also uses product repressurization before a final bed-to-bed equalization. The result of this process is that with a feed of 52% hydrogen, 42% nitrogen, 5% carbon monoxide and 1% carbon dioxide, the resulting hydrogen product is only 75% pure at a recovery of only 76%.

U.K. Patent 2,155,805 discloses a vacuum swing adsorption process for recovering hydrogen from flue gases from petrochemical plants, reduction furnaces and annealing furnaces. This patent uses a similar cycle sequence to the above U.K. patent, but includes a feed gas and product gas repressurization step. The patent describes a cocurrent depressurization to provide pressure equalization gas while simultaneously countercurrently venting the appropriate adsorption bed.

U.S. Pat. No. 4,981,499 describes a hydrogen pressure swing adsorption process in which cocurrent depressurization of the bed is made to a separate reservoir which supplies purge gas for other beds. The cocurrent depressurization is conducted while performing a countercurrent vent of the former bed. However, purging of a bed supplied with gas from the separate reservoir is not conducted at the same time as the cocurrent depressurization and countercurrent vent.

Additional references of interest in the field of pressure swing adsorption include U.S. Pat. No. 4,402,712; U.S. Pat. No. 4,969,935; U.S. Pat. No. 4,589,888; U.S. Pat. No. 4,650,501; U.S. Pat. No. 4,684,377; U.S. Pat. No. 4,917,710 and U.K. 2,237,220.

The shortcomings of the prior art are overcome by the present invention which provides a unique solution to the problem of high recovery and high purity hydrogen from low pressure, low purity hydrogen-containing gas streams, such as refinery off gases, as will be set forth in greater detail below.

BRIEF SUMMARY OF THE INVENTION

The present invention is a process for selectively separating at least one more strongly adsorbable component(s) from a less strongly adsorbable component of a feed gas mixture in a plurality of adsorption beds containing an adsorbent selective for the more strongly adsorbable component(s), comprising the steps of:

(a) introducing a feed gas mixture at elevated pressure containing the more strongly adsorbable component(s) and the less strongly adsorbable component into an inlet of a first adsorption bed containing the adsorbent selective for the more strongly adsorbable component(s) and adsorbing the more strongly adsorbable component(s) on the adsorbent while the less strongly adsorbable component passes through the first bed unadsorbed until the adsorption front of the more strongly adsorbable component(s) approaches an outlet of the first bed and terminating the introduction of the feed gas mixture;

(b) cocurrently depressurizing the first bed to a lower pressure to remove the gas mixture from the first bed and passing the gas mixture to an outlet of another bed of the plurality of adsorption beds at lower pressure to countercurrently purge the more strongly adsorbable component(s) from the other bed under the influence of a vacuum, while simultaneously countercurrently venting the first bed;

(c) countercurrently evacuating the first bed under vacuum conditions to further remove the more strongly adsorbable component(s) at the lowest pressure;

(d) countercurrently purging the first bed with cocurrently depressurizing gas mixture from another bed of the plurality of adsorption beds undergoing step (b) to remove additional more strongly adsorbable component(s) from the first bed under the influence of a vacuum;

(e) repressurizing the first bed; and
(f) performing steps (a) through (e) in each of the plurality of adsorption beds in a phased sequence.

Preferably, each bed is repressurized with feed gas mixture.

Alternatively, each bed is repressurized with less strongly adsorbable component.

Further alternatively, each bed is repressurized with feed gas mixture and with said less strongly adsorbable component.

Preferably after the step (a) adsorption step, the first bed is cocurrently depressurized to pressure equalize with another bed at a lower pressure. Alternatively, the first bed is simultaneously countercurrently depressurized to pressure equalize with another bed at lower pressure.

Preferably, after the step (d) purging, the first bed is at least partially repressurized by pressure equalization with another bed. Additionally, after the step (a) adsorption, the first bed is cocurrently depressurized to supply pressure equalization gas for another bed.

Preferably during the step (a) adsorption, less strongly adsorbable component is produced for a product and for repressurizing another bed. More preferably during step (a) adsorption, less strongly adsorbable component is produced for a product during a portion of the step (a) adsorption and less strongly adsorbable component is produced for a product and for repressurizing another bed simultaneously in another portion of the step (a) adsorption.

Preferably, between three and six parallel beds are utilized.

Preferably, the feed gas mixture is a hydrogen-containing gas mixture, said more strongly adsorbable component(s) is selected from the group consisting of nitrogen, methane, carbon monoxide, carbon dioxide and mixtures thereof and said less strongly adsorbable component is hydrogen.

Alternatively, multiple beds are performing step (a) adsorption at a given time during the process.

Alternatively, multiple beds are performing step (c) evacuation at a given time during the process.

More specifically, the present invention is a process for selectively separating at least one more strongly adsorbable component selected from the group consisting of nitrogen, methane, carbon monoxide, carbon dioxide and mixtures thereof from hydrogen in a hydrogen-containing feed gas mixture in a plurality of adsorption beds containing an adsorbent selective for the more strongly adsorbable component(s), comprising the steps of:

(a) introducing a hydrogen-containing feed gas mixture at elevated pressure containing at least one more strongly adsorbable component(s) and the hydrogen into an inlet of a first adsorption bed containing the adsorbent selective for at least one more strongly adsorbable component(s) and adsorbing a more strongly adsorbable component on the adsorbent while the hydrogen passes through the first bed unadsorbed until the adsorption front of the more strongly adsorbable component(s) approaches an outlet of the first bed and terminating the introduction of the hydrogen-containing feed gas mixture;

(b) cocurrently depressurizing the first bed to a lower pressure to remove gas from the first bed and passing the gas to an outlet of another bed of the plurality of adsorption beds at lower pressure to countercurrently purge the more strongly adsorbable component(s) from the other bed under the influence of a vacuum, while simultaneously countercurrently venting the first bed;

(c) countercurrently evacuating the first bed under vacuum conditions to further remove the more strongly adsorbable component(s) at a lowest pressure;

(d) countercurrently purging the first bed with cocurrently depressurizing gas from another bed of the plurality of adsorption beds undergoing step (b) to remove additional more strongly adsorbable component(s) from the first bed under the influence of a vacuum;

(e) repressurizing the first bed; and
(f) performing steps (a) through (e) in each of the plurality of adsorption beds in a phased sequence.

Preferably, the hydrogen-containing feed gas mixture contains less than 60% hydrogen.

Preferably, the hydrogen-containing feed gas mixture is at a pressure less than 125 psig.

Preferably, the hydrogen-containing feed gas mixture contains more than 1% carbon monoxide or carbon dioxide.

Preferably, the adsorbent is selected from the group consisting of 13X-zeolite, 5A-zeolite, CaA-zeolite, activated carbon and mixtures thereof.

Preferably, the adsorbent is layered in the plurality of adsorbent beds with a layer of activated carbon near a feed end of each bed, a layer of 13X-zeolite, a layer of 5A-zeolite and a layer of CaA-zeolite.

Preferably, the process has a recovery of at least 80% of the hydrogen in the feed gas mixture.

Preferably, the hydrogen recovered from the process has a purity of at least 950%.

Preferably, the hydrogen-containing feed gas mixture is a refinery off gas.

In a preferred embodiment, the present invention is a process for selectively separating at least one more strongly adsorbable component(s) selected from the group consisting of nitrogen, methane, carbon monoxide, carbon dioxide and mixtures thereof from hydrogen in a hydrogen-containing feed gas mixture in six parallel connected adsorption beds containing an adsorbent(s) selective for the more strongly adsorbable component(s), comprising the steps of:

(a) introducing a hydrogen-containing feed gas mixture at elevated pressure in the range of 5 to 125 psig containing at least one more strongly adsorbable component and the hydrogen into an inlet of a first adsorption bed containing the adsorbent(s) selective for at least one more strongly adsorbable component(s) and adsorbing a more strongly adsorbable component(s) on the adsorbent while the hydrogen passes through the first bed unadsorbed as a product of at least 95% purity until the adsorption front of the more strongly adsorbable component(s) approaches an outlet of the first bed and terminating the introduction of the hydrogen-containing feed gas mixture;

(b) initially cocurrently depressurizing the first bed to a lower pressure to remove gas from the first bed and passing the gas to an outlet of another bed of the six adsorption beds at lower pressure to equalize the pressure in the two adsorption beds;

(c) further cocurrently depressurizing the first bed to a lower pressure to remove gas from the first bed and passing the gas directly to an outlet of a third bed of the six adsorption beds at a lowest pressure to countercurrently purge the more strongly adsorbable component(s) from the third bed under the influence of a vacuum, while simultaneously countercurrently venting the first bed;

(d) countercurrently evacuating the first bed under vacuum conditions to further remove the more strongly adsorbable component(s) to a lowest pressure in the range of 500 to 80 Torr absolute;

(e) countercurrently purging the first bed with cocurrently depressurizing gas from another bed of the plurality of adsorption beds undergoing step (c) to remove additional more strongly adsorbable component(s) from the first bed under the influence of a vacuum;

(f) initially repressurizing the first bed by passing gas from a bed undergoing step (b) initial cocurrent depressurization to pressure equalize the two beds;

(g) repressurizing the first bed with hydrogen-containing feed gas mixture; and (h) performing steps (a) through (g) in each of the six adsorption beds in a phased sequence.

Preferably, step (g) repressurization is performed with product hydrogen and hydrogen-containing feed gas mixture.

Preferably, step (b) pressure equalization is performed between the two beds by connecting their respective outlets and their respective inlets.

Preferably, each bed has an idle period between step (f) pressure equalization and step (g) repressurization.

DETAILED DESCRIPTION OF THE INVENTION

Figure 1:
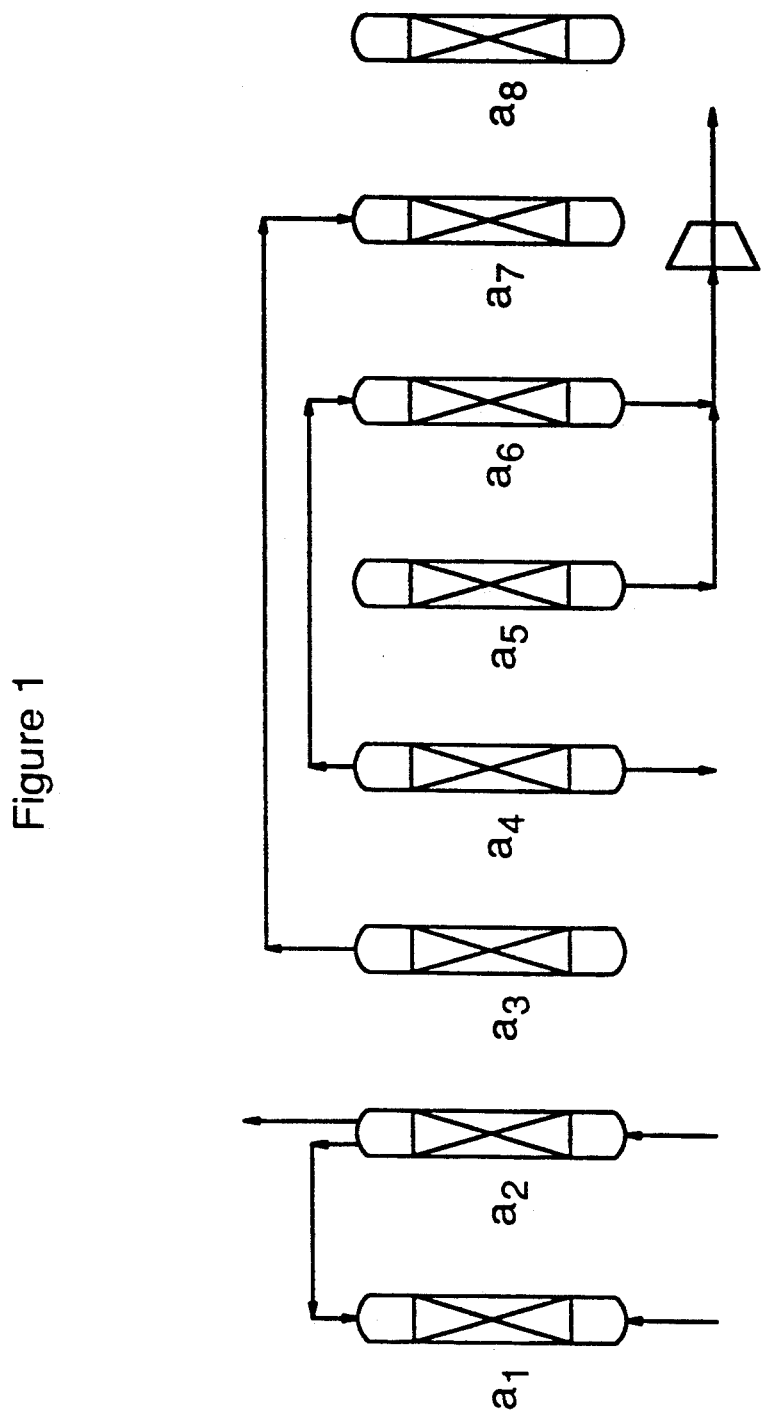
FIG. 1 is a series of schematic illustrations of an adsorption bed as it undergoes each step of the first embodiment of the present invention described in Table 1.

The present invention utilizes vacuum swing adsorption in contrast to pressure swing adsorption to recover high purity hydrogen in the range of at least 95% hydrogen, and at high recoveries in the range of 80% using a unique combination of process steps in a plurality of parallel connected adsorption beds comprising 3 to 6 parallel beds. These beds are commonly manifolded, as traditional in the art, with a common feed line, a common product line and various vent, pressure equalization and purge lines. To perform the vacuum evacuation of a regenerating bed and to draw purge gas through a purging bed under vacuum conditions, the feed end of each bed is connected through appropriate manifolding with a vacuum pump.

In addition, because of the complex compositional nature of various low hydrogen-containing potential feed streams, particularly refinery gases which contained many additional, undesired components, it is appropriate in the present invention to utilize a layered adsorption bed. A layered adsorption bed is an adsorption bed which has various distinct adsorbent layers contained within the adsorption bed in relation to the feed end and the product end. This allows discrete adsorbent selected for a particular component to remove that component prior to other components being removed by other adsorbents selected for such other components.

The following adsorptive gas separation cycle embodiments are suggested to recover hydrogen from a low pressure (4125 psig), low hydrogen purity (<60%) feed stream. A key application for this process is the purification of low heating value, low hydrogen concentration refinery off gas streams containing significant levels of nitrogen, methane, carbon monoxide and carbon dioxide. The steps for the first embodiment having a 6 bed, 1 equalization, feed repressurization process cycle are:

1. Feed to repressurize bed with optional product assistance.
2. Feed at adsorption pressure; some or all of effluent is hydrogen product with optional diversion of some product to assist repressurization in Step 1.
3. Concurrent or optional countercurrent or dual end depressurization to provide equalization gas in Step 7.
4. Dual end blowdown/provide purge; countercurrent blowdown gas is waste and cocurrent provide purge gas is sent to the countercurrent purge in Step 6.

5. Countercurrent evacuation to waste.
6. Countercurrent vacuum purge with effluent to waste.
7. Countercurrent or optional cocurrent or dual end pressure equalization received from Step 3.
8. Idle step.

Table 1 depicts the time chart for this VSA embodiment. The pressure equalization step in this cycle makes it most suited for the higher feed pressure part of the operating spectrum while the product assisted feed repressurization aspect of this cycle makes it most suited for the lower feed purity part of the operating spectrum. With two beds on feed and two beds on evacuation in this cycle, the process is more energy efficient at the expense of increased capital equipment so the cycle is more suited for applications where unit power costs are high relative to capital equipment costs. With one bed continuously generating steady product flow, it is also possible to eliminate the product surge tank associated with conventional prior art designs.

With reference to Table 1, the various steps will be identified for the first of six beds. The beds are represented on the vertical axis of the Table while the steps are represented on the horizontal axis of the Table.

Each bed goes through an identical sequence of steps, but in different time relationship one to another. For instance, the first bed at the top of the Table goes through the sequence of feed gas mixture repressurization, optionally using a portion of the product produced in another bed to assist repressurizing the first bed, identified as FEED REPRESS/PROD ASSIST; the next step is introduction of feed gas mixture to adsorb more strongly adsorbable components while producing a product of less strongly adsorbable components, identified as FEED PRODUCT; the third step is cocurrent depressurization of the first bed while the inlet of the bed is closed off to provide pressure equalization gas for the fourth bed, identified as CoC DEPRESS; the fourth step occurring in the first bed is further cocurrently depressurizing the bed to provide purge gas for the fifth bed undergoing vacuum purge while at the same time countercurrently venting the first bed, identified as PROV PUR/BLOWDOWN; the next step for the first bed is countercurrent evacuation under vacuum conditions by connecting the feed end of the bed to a source of vacuum such as a vacuum pump, identified as EVACUATION; the sixth step is countercurrently purging the bed with cocurrent depressurization gas from the third bed and passing this purge gas through the first bed under vacuum conditions to purge residual gas components from the bed, identified as VACUUM PURGE; the seventh step is pressure equalization with a fourth bed undergoing co-current depressurization by connecting the product ends of the two beds together and optionally connecting the feed ends of the beds together to transfer cocurrent depressurization gas to the first bed to a point approximating pressure equalization, identified as P EQUAL; and the last step occurring in the first bed is an idle step wherein no function is carried out in the bed and exists to reconcile appropriate timing of steps in the six beds, identified as IDLE.

This sequence identified in Table 1 is illustrated with regard to FIG. 1. In FIG. 1 the first of six parallel connected adsorption beds is illustrated in the eight steps sequentially identified in Table 1. FIG. 1 is not a representation of eight parallel beds, but rather the same bed shown in a sequence of succeeding operations. For instance, bed $a_1$ in the first step undergoes feed (optional product) repressurization. That same bed in the next process step in the sequence depicted as $a_2$ undergoes introduction of feed for adsorption more strongly adsorbed components to produce a product of less strong adsorbed component or hydrogen. Optionally, some of the product may be transferred from the effluent end of bed $a_2$ to another bed which is undergoing the initial repressurization illustrated in $a_1$. The first bed is then shown after the end of the feed step to undergo cocurrent depressurization to provide equalization repressurization gas to another bed by connecting product end to product end or effluent end to effluent end. In this case the first bed shown in $a_3$ is illustrated as connecting with a bed which is at that time undergoing what eventually will be the process step of $a_7$ for the first bed. Optionally, this pressure equalization can also occur from feed end to feed end, from effluent to effluent end, or from both ends simultaneously.

The first bed then undergoes simultaneous cocurrent depressurization to provide purge gas while being countercurrently vented to remove waste gas or more strongly adsorbed component. This is shown with regard to $a_4$. The first bed in step $a_4$ is connected to another bed undergoing vacuum purge at this time as will occur in the first bed during the step of $a_6$ as illustrated. The first bed is then countercurrently evacuated as illustrated in $a_5$ by connection to an appropriate vacuum source, such as a vacuum pump.

Next the first bed as illustrated in $a_6$ is subject to countercurrent vacuum purging using cocurrent depressurization gas from another bed at that point in time undergoing the prior step of the first bed, identified as $a_4$. During the step $a_6$ of countercurrent vacuum purging, the purge effluent is also removed by appropriate vacuum source, such as a vacuum pump. The first bed is then initially repressurized with pressure equalization gas as illustrated in $a_7$. This gas is provided from another bed undergoing what was previously illustrated for the first bed in $a_3$. Co-current depressurization gas is provided on a product end to product end (effluent end to effluent end) and optionally can also be provided in a feed end to feed end or in a simultaneous feed end to feed end and effluent end to effluent end basis.

Finally, the first bed is subject to an idle step for timing purposes as illustrated in $a_8$. This completes the sequence of steps which the first bed undergoes as illustrated in $a_1$ through $a_8$. Each bed of the six bed embodiment would undergo a similar series of steps as illustrated in FIG. 1 with the time relation of one bed to the other as illustrated in Table 1.

TABLE 1

| FEED REPRESS/PROD ASSIST | FEED PRODUCT | CoC DEPRESS | PROV PUR/ BLOWDOWN | EVACUATION | VACUUM PURGE | P EQUAL | IDLE |
|---|---|---|---|---|---|---|---|
| IDLE | FEED REPRESS/ PROD ASSIST | FEED PRODUCT | CoC DEPRESS | PROV PUR/ BLOWDOWN | EVACUATION | VACUUM PURGE | P EQUAL |
| P EQUAL | IDLE | FEED REPRESS/ PROD ASSIST | FEED PRODUCT | CoC DEPRESS | PROV PUR/ BLOWDOWN | EVACUATION | VACUUM PURGE |
| VACUUM PURGE | P EQUAL | IDLE | FEED REPRESS/ PROD ASSIST | FEED PRODUCT | CoC DEPRESS | PROV PUR/ BLOWDOWN | EVACUATION |
| EVACUATION | VACUUM PURGE | P EQUAL | IDLE | FEED REPRESS/ PROD ASSIST | FEED PRODUCT | CoC DEPRESS | PROV PUR/ BLOWDOWN |
| PROV PUR/ BLOWDOWN | EVACUATION | VACUUM PURGE | P EQUAL | IDLE | FEED REPRESS/ PROD ASSIST | FEED PRODUCT | CoC DEPRESS |
| CoC DEPRESS | PROV PUR/ BLOWDOWN | EVACUATION | VACUUM PURGE | P EQUAL | IDLE | FEED REPRESS/ PROD ASSIST | FEED PRODUCT |
| FEED PRODUCT | CoC DEPRESS | PROV PUR/ BLOWDOWN | EVACUATION | VACUUM PURGE | P EQUAL | IDLE | FEED REPRESS/ PROD ASSIST |

A specific application of the 6 bed product assisted feed repressurization cycle described uses a four-layer adsorption bed consisting of 3.5 feet of activated carbon followed by 2 feet of 13X zeolite followed by 1.5 feet of 5A zeolite followed by 5 feet of calcium exchanged X zeolite for the removal of large feed concentrations (>1%) of carbon monoxide and carbon dioxide down to ppm levels with only moderate thermal cycling in the sorbent bed. Specific feed conditions for this application demonstration were 75 psig and 75° F. with a composition of 2% CO, 22% $CO_2$, 55% $N_2$ and 21% $H_2$. In this application, the base cycle has a hydrogen recovery of 85% at 97% purity with a 0.15 mlbmol/(lb 6 min. cycle) hydrogen in product capacity and 0.83 mlbmol/(lb 6 min. cycle) feed capacity as calculated by simulation.

The second cycle, employing 6 beds with solely product repressurization and one equalization step, is depicted in Table 2. The cycle steps and sequence are identical to the 6 bed product assisted feed repressurization cycle with the exception that the repressurization step replaces the idle step and the feed steps are divided differently to provide sufficient product flow for the product repressurization step. Again, two beds are on feed and under vacuum continuously throughout the cycle. This embodiment is better than the first embodiment at relatively higher feed purities.

This second embodiment identified in Table 2 is also a six bed process undergoing a sequential series of ten steps. Again, the beds are represented on the vertical axis and their respective process steps are represented on the horizontal axis. With regard to the first bed, each bed will undergo a series of steps including feed gas mixture to produce product, identified as FEED>PROD; feed gas mixture introduction to produce product and repressurization gas, identified as F>P+RP; another step of feed gas mixture introduction to provide product, identified as FEED>PROD; another step of feed gas mixture introduction to provide product and repressurization gas, identified as F>P+RP; cocurrent depressurization to provide pressure equalization gas for the fourth bed, identified as CoC DEPRESS; a simultaneous cocurrent depressurization to provide purge gas and countercurrent venting wherein the purge gas is provided to the fifth bed, this step identified as PROV PUR/BLOWDOWN; a countercurrent evacuation step, identified as EVACUATION; a countercurrent vacuum purge step in which cocurrent depressurization gas from the third bed is provided to the first bed which step is identified as VACUUM PURGE; a pressure equalization step in which the first bed is partially repressurized countercurrently with cocurrent depressurization gas from the fourth bed in which this step is identified as P EQUAL; and finally product repressurization with gas produced in both the fifth and sixth beds in which the repressurization is done countercurrently and identified in Table 2 as REPRESS. Each bed undergoes a similar series of steps in shifted time sequence, as identified in Table 2.

Figure 2:
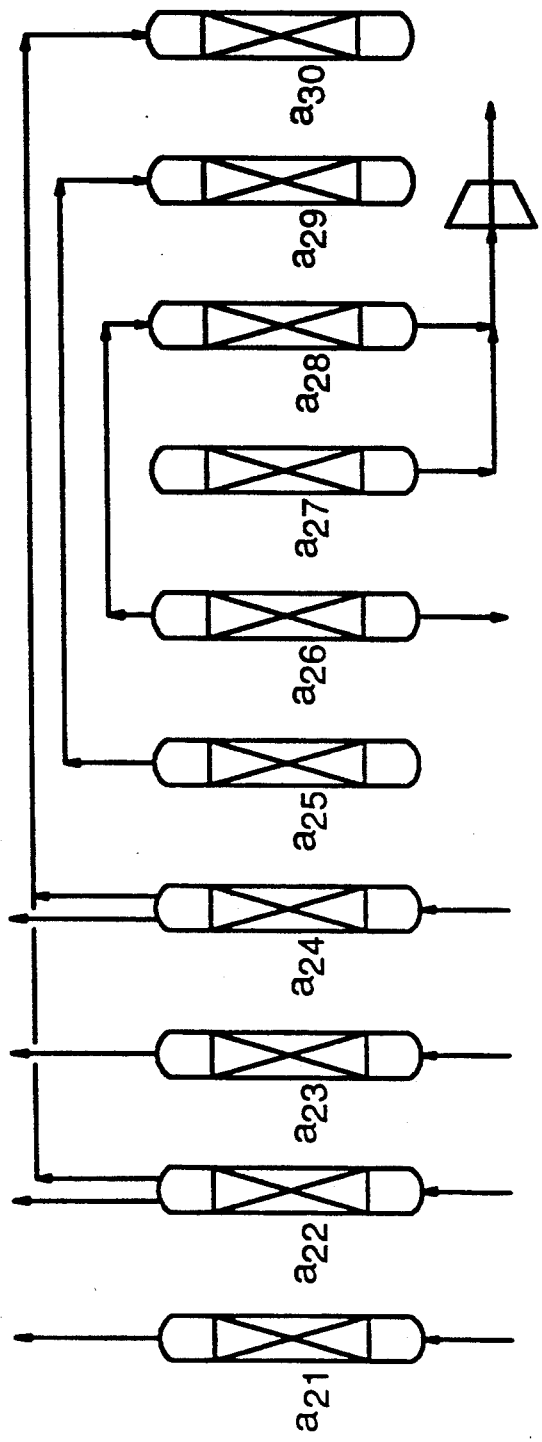
FIG. 2 is a series of schematic illustrations of an adsorption bed as it undergoes each step of the second embodiment of the present invention described in Table 2.

This process embodiment is illustrated with regard to FIG. 2. This embodiment is illustrated in a comparable manner as the first embodiment with regard to FIG. 1. In other words, the illustration is of only one bed showing a series of sequential steps that are performed on that bed in time sequence in relation to Table 2. The drawing will be described with relation to the first bed although it is understood that each bed will perform a comparable series of steps. The first bed will undergo feed gas mixture introduction to produce product as illustrated in $a_{21}$. Next, the first bed will provide some of its product as repressurization gas as identified in $a_{22}$. Then, the first bed will go back to dedicated product production as illustrated with regard to $a_{23}$. Finally, feed gas introduction ends with joint production of product and product for repressurization as illustrated with regard to $a_{24}$. In both $a_{22}$ and $a_{24}$ the first bed provides product for repressurization to other beds undergoing the steps illustrated with regard to the first bed in $a_{30}$. The first bed is then cocurrently depressurized to provide pressure equalization gas as illustrated in $a_{25}$. This gas would be provided to another of the beds undergoing pressure equalization as illustrated with regard to the first bed at $a_{29}$. Optionally, pressurization could be done from feed end to feed end or simultaneously from feed end to feed end and effluent end to effluent end. The first bed then undergoes cocurrent depressurization to provide purge gas while simultaneously being vented countercurrently. This is illustrated with regard to the first bed at $a_{26}$. The co-current depressurization gas would be provided to another bed undergoing vacuum purge as is illustrated with regard to the first bed at $a_{28}$. The first bed is then countercurrently evacuated by connection to a vacuum source such as a vacuum pump as illustrated at $a_{27}$. The first bed then undergoes vacuum purging with cocurrent depressurization gas and connection to an appropriate vacuum source, such as a vacuum pump as illustrated with regard to the first bed at $a_{28}$. The source of the purge gas would be co-current depressurization gas from another of the beds undergoing the step illustrated with regard to the first bed at $a_{26}$. The first bed next is initially repressurized using equalization gas as illustrated with regard to $a_{29}$ using co-current depressurization gas from another bed under what is illustrated with regard to the first bed at $a_{25}$. Again, optionally, this pressure equalization can be done also feed end to feed end or simultaneously from feed end to feed end and effluent end to effluent end. Finally, the first bed undergoes countercurrent product repressurization illustrated with regard to $a_{30}$. All of the beds will undergo the process steps that are identified with regard to the first bed illustrated with $a_{21}$ through $a_{30}$. However their time relationship is identified with regard to Table 2.

TABLE 2

| FEED> PROD | F>P+RP | FEED> PROD | F>P+RP | CoC DEPRESS | PROV PUR/ BLOWDOWN | EVACUATION | VACUUM PURGE | P EQUAL | REPRESS |
|---|---|---|---|---|---|---|---|---|---|
| P EQUAL | REPRESS | FEED> PROD | F>P+RP | FEED> PROD | F>P+RP | CoC DEPRESS | PROV PUR/ BLOWDOWN | EVACUATION | VACUUM PURGE |
| EVAC | VACUUM PURGE | P EQUAL | REPRESS | FEED> PROD | F>P+RP | FEED> PROD | F>P+RP | CoC DEPRESS | PROV PUR/ BLOWDOWN |
|  | EVACUATION | VACUUM PURGE | P EQUAL | REPRESS | FEED> PROD | F>P+RP | FEED> PROD | F>P+RP | CoC DEPRESS |
|  | PROV PUR/ BLOWDOWN | EVACUATION | VACUUM PURGE | P EQUAL | REPRESS | FEED> PROD | F>P+RP | FEED> PROD | F>P+RP |
| CoC DEPRESS | PROV PUR/ BLOWDOWN | EVACUATION | VACUUM PURGE | P EQUAL | REPRESS | FEED> PROD | F>P+RP | FEED> PROD | F>P+RP |
| FEED> PROD | F>P+RP | CoC DEPRESS | PROV PUR/ BLOWDOWN | EVACUATION | VACUUM PURGE | P EQUAL | REPRESS | FEED> PROD | F>P+RP |

The third cycle, employing 5 beds with product assisted feed repressurization and no equalization steps, is depicted in Table 3. The cycle steps and sequence are identical to the 6 bed product assisted feed repressurization option with the exception that there are no pressure equalization or idle steps so only 5 beds are needed. Again, two beds are on feed and under vacuum continuously throughout the cycle while only one bed continuously provides a constant product flow. This embodiment is better than the first embodiment at relatively lower feed pressures.

The series of steps performed in five parallel connected beds for the third cycle is identified in Table 3 and includes feed gas mixture repressurization, identified as FEED REPRESS; product production from introduction of feed gas mixture for adsorption of the more strongly adsorbed components, identified as FEED PRODUCT; simultaneous cocurrent depressurization to provide purge gas and countercurrent vent, identified as PROV PUR/BLOWDOWN; countercurrent evacuation, identified as EVACUATION; and countercurrent vacuum purge with cocurrent depressurization gas, identified as VACUUM PURGE. The arrangement is comparable to the other tables with regard to beds being identified on the vertical axis and process steps on the horizontal axis.

Figure 3:
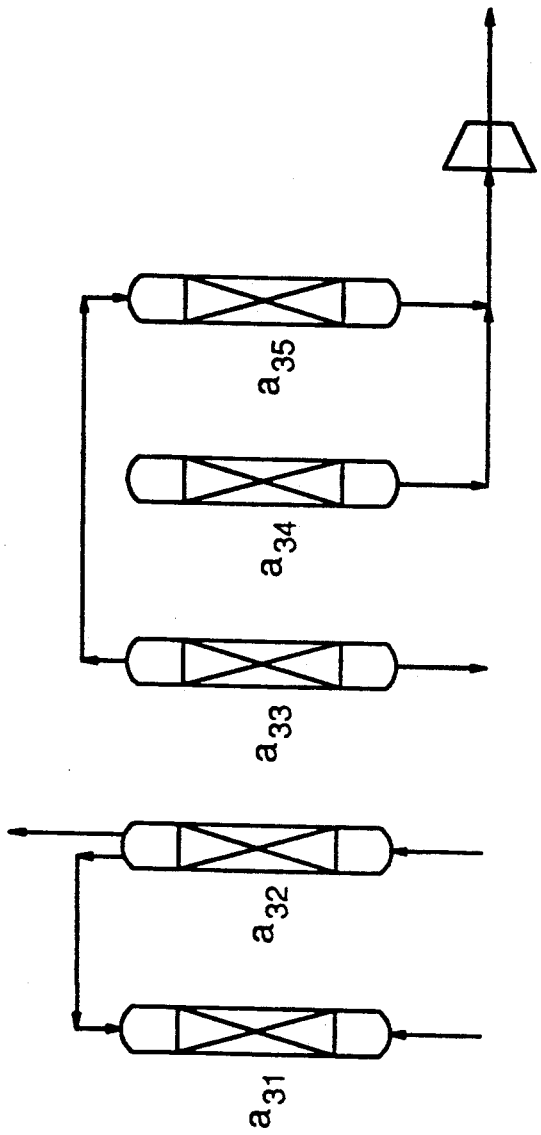
FIG. 3 is a series of schematic illustrations of an adsorption bed as it undergoes each step of the third embodiment of the present invention described in Table 3.

This process sequence in Table 3 is illustrated with regard to a first bed in FIG. 3. In FIG. 3, the first bed at $a_{31}$ undergoes feed repressurization but could optionally simultaneously undergo countercurrent product repressurization from another of the beds undergoing what is depicted for the first bed at $a_{32}$. The first bed is then placed on product production by introduction of feed gas mixture, adsorption of more strongly adsorbed components and the production of a product of less strongly adsorbed component, as depicted at $a_{32}$. The first bed then undergoes simultaneous cocurrent depressurization to provide purge gas and countercurrent venting, as depicted at $a_{33}$. The bed then undergoes countercurrent evacuation, as depicted at $a_{34}$, by connection to an appropriate vacuum source, such as a vacuum pump. Finally, the first bed undergoes countercurrent vacuum purging with cocurrent depressurization gas from another bed undergoing the step illustrated with regard to the first bed at $a_{33}$. The countercurrent vacuum purging is depicted at $a_{35}$. Connection to an appropriate vacuum source, such as a vacuum pump, is also depicted. Each bed undergoes a series of steps as illustrated for the first bed comparable to the steps $a_{31}$ through $a_{35}$. However, they are in time relationship one to another as identified in Table 3.

(>1%) of carbon monoxide and carbon dioxide down to ppm levels with minimal thermal cycling in the sorbent bed. Specific feed conditions for this application demonstration were 10 psig and 75° F. with a composition of 22% CO, 8% $CO_2$, 53% $N_2$, and 17% $H_2$. In this application, the third cycle has hydrogen recovery of 68% at 97% purity with a 0.061 mlbmol/(lb 6 min. cycle) hydrogen in product capacity and 0.53 mlbmol/(lb 6 min. cycle) feed capacity as calculated by simulation.

The fourth cycle embodiment, employing 5 beds with solely product repressurization and no equalization steps, is depicted in Table 4. The cycle steps and sequence are identical to the 5 bed feed repressurization option with the exception that the repressurization step shifts the evacuation and vacuum purge more forward in the cycle and the feed steps are divided differently to provide sufficient product flow for the product repressurization step. Again, two beds are on feed and under vacuum continuously throughout the cycle. This embodiment is better than the third embodiment at relatively higher feed purities.

Table 4 demonstrates the eight process steps along the horizontal axis which are performed in five parallel connected adsorption beds along the vertical axis of the table. The process steps are introduction of feed gas mixture to absorb more strongly adsorbed component and produce less strongly adsorbed component product, identified as FEED>PROD; feed gas mixture to produce product and repressurization gas, identified as F>P+RP; feed gas mixture to produce product, identified as FEED>PROD; feed gas mixture introduction to produce product and repressurization gas, identified as F>P+RP; simultaneous cocurrent depressurization to provide purge gas and countercurrent venting, identified as PROV PUR/BLOWDOWN; countercurrent evacuation, identified as EVACUATION; countercurrent vacuum purge using cocurrent depressurization gas, identified as VACUUM PURGE; and product repressurization identified as REPRESS. Each bed will undergo similar process steps in varied time sequence with regard to that depicted in Table 4.

Figure 4:
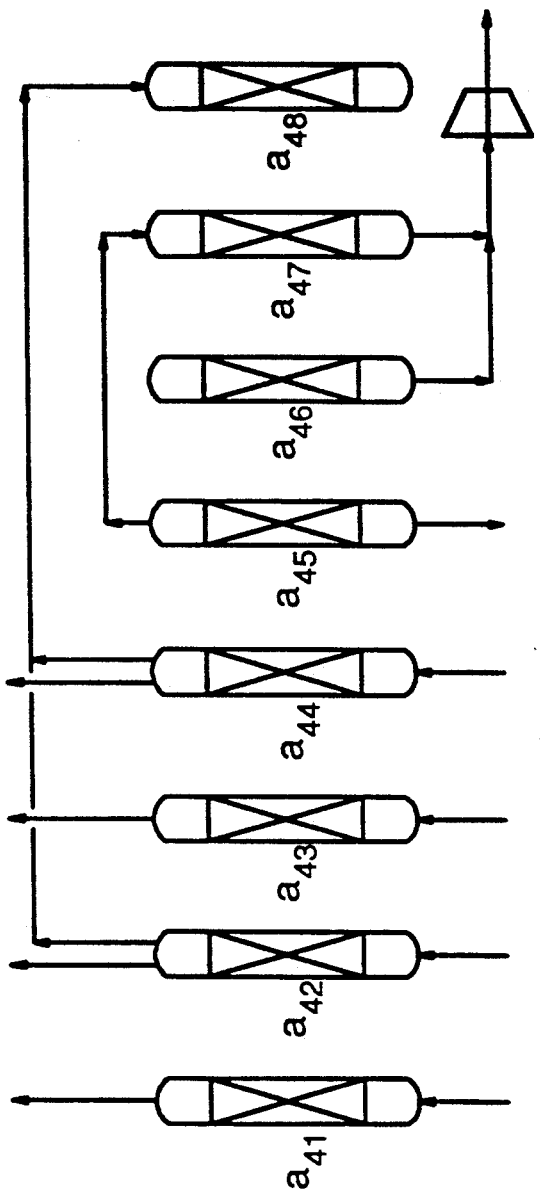
FIG. 4 is a series of schematic illustrations of an adsorption bed as it undergoes each step of the fourth embodiment of the present invention described in Table 4.

The process steps are illustrated with regard to FIG. 4. The illustrations identify the process steps which the first bed undergoes, but it is understood that each bed will undergo a similar series of steps. At $a_{41}$ feed gas is introduced into the first bed to produce product. At $a_{42}$ feed gas is introduced to produce product and product repressurization gas which is illustrated going to another bed undergoing the step illustrated for the first bed at $a_{48}$. The first bed then undergoes the step illus-

TABLE 3

| FEED REPRESS | FEED PRODUCT | PROV PUR/ BLOWDOWN | EVACUATION | VACUUM PURGE |
|---|---|---|---|---|
| VACUUM PURGE | FEED REPRESS | FEED PRODUCT | PROV PUR/ BLOWDOWN | EVACUATION |
| EVACUATION | VACUUM PURGE | FEED REPRESS | FEED PRODUCT | PROV PUR/ BLOWDOWN |
| PROV PUR/ BLOWDOWN | EVACUATION | VACUUM PURGE | FEED REPRESS | FEED PRODUCT |
| FEED PRODUCT | PROV PUR/ BLOWDOWN | EVACUATION | VACUUM PURGE | FEED REPRESS |

A specific application of the 5 bed product assisted feed repressurization cycle described uses a four-layer adsorption bed consisting of 3 feet of activated carbon followed by 1 foot of 13X zeolite followed by 2.5 feet of 5A zeolite followed by 5.5 feet of calcium exchanged X zeolite for the removal of large feed concentrations trated at $a_{43}$, comparable to $a_{41}$, and next a step $a_{44}$ comparable to step $a_{42}$. The first bed then undergoes cocurrent depressurization to provide purge gas while undergoing simultaneous countercurrent venting as depicted at $a_{45}$. Countercurrent evacuation is performed on the first bed as depicted at $a_{46}$. Countercurrent vacuum purge is depicted at $a_{47}$ with regard to the first bed wherein it is connected to an appropriate source of vacuum, such as a vacuum pump and receives cocurrent depressurization gas from another of the beds undergoing what is depicted for the first bed at $a_{45}$. The first bed is then countercurrent repressurized with product gas as depicted at $a_{48}$ receiving product gas from other beds undergoing the step depicted with regard to the first bed of $a_{42}$ and $a_{44}$. Each bed with regard to the time sequence illustrated in Table 4 will undergo the illustrated steps of FIG. 4 with regard to $a_{41}$ through $a_{48}$.

to feed and effluent to effluent pressure equalization, identified as P EQUAL; and product repressurization performed countercurrently with product from the fourth bed undergoing feed product, this bed step identified as PROD REPRESS. Optionally, product repressurization can be omitted and an idle step would be inserted in its place.

Figure 5:
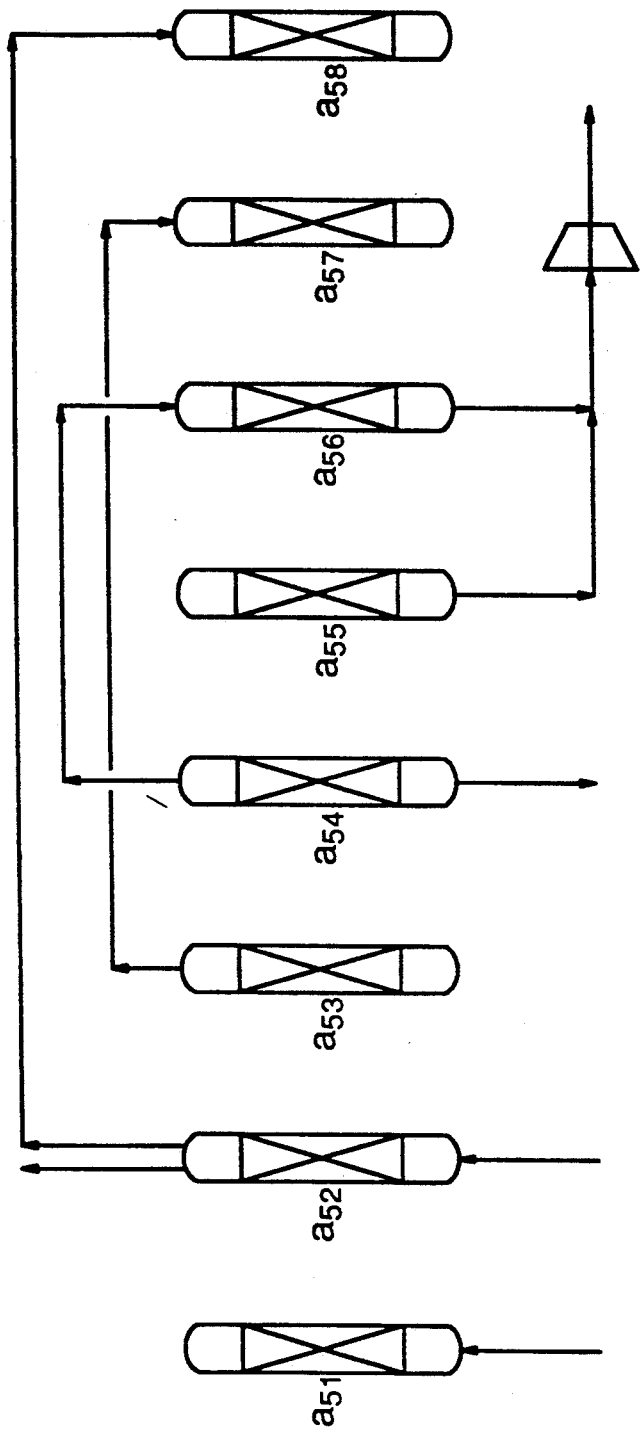
FIG. 5 is a series of schematic illustrations of an adsorption bed as it undergoes each step of the fifth embodiment of the present invention described in Table 5.

These steps are illustrated with regard to the first of the four beds in FIG. 5. With regard to FIG. 5, the first bed initially goes through feed gas mixture repressurization illustrated with regard to $a_{51}$. The first bed then produces product as illustrated in $a_{52}$ and produces

TABLE 4

| FEED> PROD | F>P+ RP | FEED> PROD | F>P+ RP | PROV PUR/ BLOW-DOWN | EVACUATION | | VACUUM PURGE | RE-PRESS |
|---|---|---|---|---|---|---|---|---|
| VACUUM PURGE | RE-PRESS | FEED> PROD | F>P+ RP | FEED> PROD | F>P+ RP | PROV PUR/ BLOW-DOWN | EVACUATION | |
| EVACUATION | | VACUUM PURGE | RE-PRESS | FEED> PROD | F>P+ RP | FEED> PROD | F>P+ RP | PROV PUR/ BLOW-DOWN | EVAC-UATION |
| PROV PUR/ BLOW-DOWN | | EVACUATION | | VACUUM PURGE | RE-PRESS | FEED> PROD | F>P+ RP | FEED> PROD | F>P+ RP |
| FEED> PROD | F>P+ RP | PROV PUR/ BLOW-DOWN | | EVACUATION | | VACUUM PURGE | RE-PRESS | FEED> PROD | F>P+ RP |

The fifth cycle embodiment, employing 4 beds with optional product assisted feed repressurization and one equalization step, is depicted in Table 5. The cycle steps and sequence are identical to the 6 bed product assisted feed repressurization embodiment with the exceptions that only one bed is on feed or under vacuum at a time so only 4 beds are needed and the optional product assisted repressurization step occurs separately from the feed repressurization step. This embodiment is better than the corresponding 6 bed embodiment when unit power costs are low relative to capital equipment costs (smaller plants).

This fifth embodiment, the steps of which are identified in Table 5, is performed in four parallel connected beds represented on the vertical axis of Table 5 while the process steps which each bed undergoes are represented on the horizontal axis. Those steps include: feed gas mixture repressurization, identified as FEED REPRESS; feed gas mixture introduction to adsorb more strong adsorbed components and produce a product of less strongly adsorbed components as well as producing product repressurization gas for another bed, identified as FEED PRODUCT +RP; cocurrent depressurization to provide pressure equalization gas to the third bed, identified as COC DP; simultaneous cocurrent depressurization to provide purge gas to the fourth bed while undergoing countercurrent venting identified as PROV PUR/BLOWDOWN; countercurrent evacuation identified as EVAC; countercurrent vacuum purge with cocurrent depressurization gas from the second bed, identified as VACUUM PURGE; initial repressurization with countercurrent pressure equalization gas provided from the third bed undergoing cocurrent depressurization with the option of additionally doing feed to feed pressure equalization or simultaneous feed repressurization gas for a bed undergoing the same step as depicted for the first bed at $a_{58}$. The first bed is then cocurrent depressurized to provide pressure equalization gas, as depicted in $a_{53}$, this gas can go to another bed under the same step as illustrated for the first bed at $a_{57}$. Optionally, equalization gas can also be transferred feed end to feed end of the bed or simultaneously transferred feed end to feed end and effluent end to effluent end of the bed. The first bed then undergoes cocurrent depressurization to provide purge gas with the simultaneous countercurrent venting as depicted at $a_{54}$. The purge gas is transferred to another bed undergoing countercurrent purge as depicted for the first bed at $a_{56}$. The first bed is then countercurrently evacuated as depicted at $a_{55}$. The bed is connected to a source of vacuum such as vacuum pump. The first bed then undergoes countercurrent vacuum purge by being connected to a source of vacuum, such as a vacuum pump, while receiving cocurrent depressurization gas from another bed undergoing the step as depicted for the first bed at $a_{54}$. This vacuum purge is illustrated at a The first bed then undergoes pressure equalization as depicted at $a_{57}$ with co-current depressurization gas provided from a bed undergoing the step depicted for the first bed at $a_{53}$. Again, optionally, feed to feed pressure equalization or simultaneous feed to feed and effluent to effluent pressure equalization could be performed. The first bed then undergoes product repressurization as depicted at $a_{58}$ with a portion of the product from another bed undergoing the step depicted for the first bed at $a_{52}$. Optionally, product repressurization may be omitted and the first bed will undergo an idle step at $a_{58}$. Each bed undergoes the steps depicted in a through $a_{58}$ as identified in Table 5.

TABLE 5

| FEED REPRESS | FEED PRODUCT + RP | CoC DP | PROV PUR/ BLOWDOWN |
|---|---|---|---|
| P EQUAL | PROD REPRESS | FEED REPRESS | FEED PRODUCT + RP |
| EVAC | VACUUM PURGE | P EQUAL | PROD REPRESS |

TABLE 5-continued

| CoC | PROV PUR/ BLOWDOWN | EVAC | VACUUM PURGE |
| --- | --- | --- | --- |
| EVAC | VACUUM PURGE | P EQUAL | PROD REPRESS |
| CoC DP | PROV PUR/ BLOWDOWN | EVAC | VACUUM PURGE |
| FEED REPRESS | FEED PRODUCT + RP | CoC DP | PROV PUR/ BLOWDOWN |
| P EQUAL | PROD REPRESS | FEED REPRESS | FEED PRODUCT + RP |

The sixth cycle embodiment, employing 4 beds with solely product repressurization and one equalization step, is depicted in Table 6. The cycle steps and sequence are identical to the 6 bed product only repressurization embodiment with the exception that only one bed is on feed or under vacuum at a time so only 4 beds are needed. This embodiment is better than the corresponding 6 bed embodiment when unit power costs are low relative to capital equipment costs (smaller plants).

Table 6 shows an embodiment of the present invention using four beds with an eight step cycle sequence. The four beds are depicted along the vertical axis and the cycle steps are depicted along the horizontal axis of the table. Each bed goes through the sequence of steps including: feed to produce product, identified as FEED>PROD; feed to produce product and to provide repressurization gas, identified as FEED>PROD+REPRESS; cocurrent depressurization to provide pressure equalization gas for the third bed, identified as CoC DP; simultaneous cocurrent depressurization to provide purge gas along with countercurrent venting, identified as PROV PUR/BLOWDOWN; countercurrent evacuation, identified as EVAC; countercurrent vacuum purge with purge gas provided from the second bed, identified as CCC VACUUM PURGE; initial pressurization with pressure equalization gas provided by the cocurrent depressurization of the third bed, identified as P EQUAL; and product repressurization provided from the fourth bed, identified as PRODUCT REPRESS. Each bed undergoes a similar sequence of steps.

Figure 6:
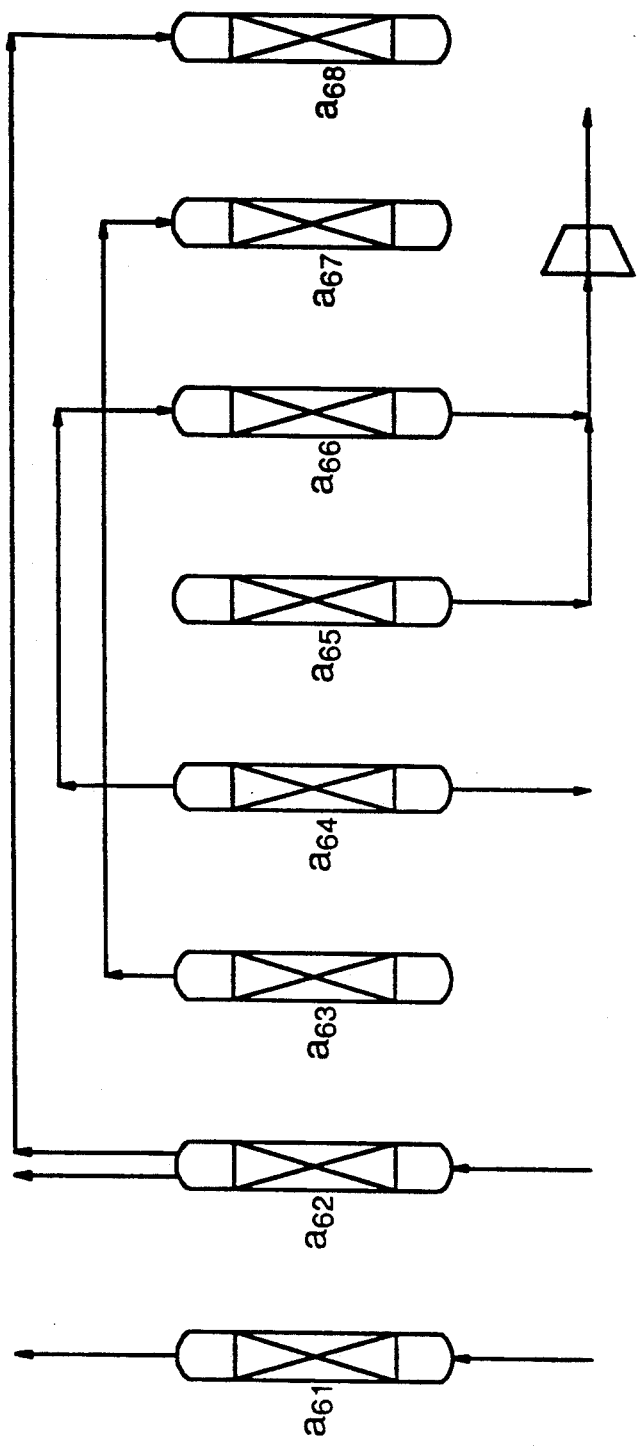
FIG. 6 is a series of schematic illustrations of an adsorption bed as it undergoes each step of the sixth embodiment of the present invention described in Table 6.

These steps are illustrated with regard to FIG. 6 wherein the first bed is illustrated sequentially in each individual step experienced by all four of the beds, identified in FIG. 6 as $a_{61}$ through $a_{68}$. In FIG. 6, the first bed is depicted at $a_{61}$ as feed gas mixture is introduced and a less strongly adsorbed product is produced at the effluent end of the bed. In the second portion of the introduction of feed gas mixture depicted in $a_{62}$, product is produced, as well as repressurization gas for another bed undergoing the same step as depicted for the first bed at $a_{68}$. Co-current depressurization to provide pressure equalization gas is accomplished in the first bed as depicted at $a_{63}$, the equalization gas being provided to another bed undergoing the same step as is depicted for the first bed at $a_{67}$. Optionally, feed to feed pressure equalization or simultaneous feed to feed and effluent to effluent pressure equalization could also be accomplished. The first bed then undergoes cocurrent depressurization to provide purge gas simultaneous with countercurrent venting as depicted in $a_{64}$. The purge gas is supplied to another of the four beds presently undergoing the same step as depicted for the first bed at $a_{66}$. The first bed then undergoes countercurrent evacuation by being connected to a source of vacuum, such as a vacuum pump as depicted in $a_{65}$. The first bed is then vacuum purged countercurrently by being supplied with purge gas from another bed undergoing the same step as depicted for the first bed at $a_{64}$. The vacuum purging depicted in $a_{66}$ is accomplished by connecting the first bed to a source of vacuum such as a vacuum pump. The first bed is then initially repressurized using cocurrent depressurization gas as pressure equalization gas as depicted in $a_{67}$. This co-current depressurization gas is provided for pressure equalization from a bed currently undergoing cocurrent depressurization as depicted for the first bed at $a_{63}$. As stated previously, optionally this can be a feed to feed pressure equalization or a simultaneous feed to feed and effluent to effluent pressure equalization as well as a product to product pressure equalization. Finally, the first bed is repressurized countercurrently with product gas as depicted in $a_{68}$. This product repressurization gas comes from another bed that is simultaneously undergoing the step depicted for the first bed in $a_{62}$.

TABLE 6

| FEED>PROD | FEED>PROD+REPRESS | CoC DP | PROV PUR/BLOWDOWN |
| --- | --- | --- | --- |
| P EQUAL | PRODUCT REPRESS | FEED>PROD | FEED>PROD+REPRESS |
| EVAC | CCC VACUUM PURGE | P EQUAL | PRODUCT REPRESS |
| CoC | PROV PUR/BLOWDOWN | EVAC | CCC VACUUM PURGE |
| EVAC | CCC VACUUM PURGE | P EQUAL | PRODUCT REPRESS |
| CoC DP | PROV PUR/BLOWDOWN | EVAC | CCC VACUUM PURGE |
| FEED>PROD | FEED>PROD+REPRESS | CoC DP | PROV PUR/BLOWDOWN |
| P EQUAL | PRODUCT REPRESS | FEED>PROD | FEED>PROD+REPRESS |

The seventh cycle embodiment, employing 3 beds with optional product assisted feed repressurization and no equalization steps, is depicted in Table 7. The cycle steps and sequence are identical to the 5 bed product assisted feed repressurization embodiment with the exceptions that only one bed is on feed or under vacuum at a time so only 3 beds are needed and the optional product assisted repressurization step occurs separately from the feed repressurization step. This embodiment is better than the corresponding 5 bed embodiment when unit power costs are low relative to capital equipment costs (smaller plants).

Table 7 illustrates a cycle sequence for three beds as represented on the vertical axis and six steps for each bed as represented in the horizontal axis of the Table. Those steps include feed gas mixture repressurization, identified as FEED REPRESS; feed gas mixture introduced to adsorb more strongly adsorbed components to produce a product of less strongly adsorbed component, identified as FEED PRODUCT; simultaneous cocurrent depressurization to provide purge gas along with countercurrent venting, identified as PROV PUR/BLOWDOWN; countercurrent evacuation, identified as EVACUATION; countercurrent vacuum purge with cocurrent depressurization gas from the second bed, identified as VAC PURGE; and product repressurization in a countercurrent mode utilizing a portion of the product from the third bed, identified as PROD REPRESS. Each bed undergoes that series of steps but in the time sequence interrelationship per Table 7.

Figure 7:
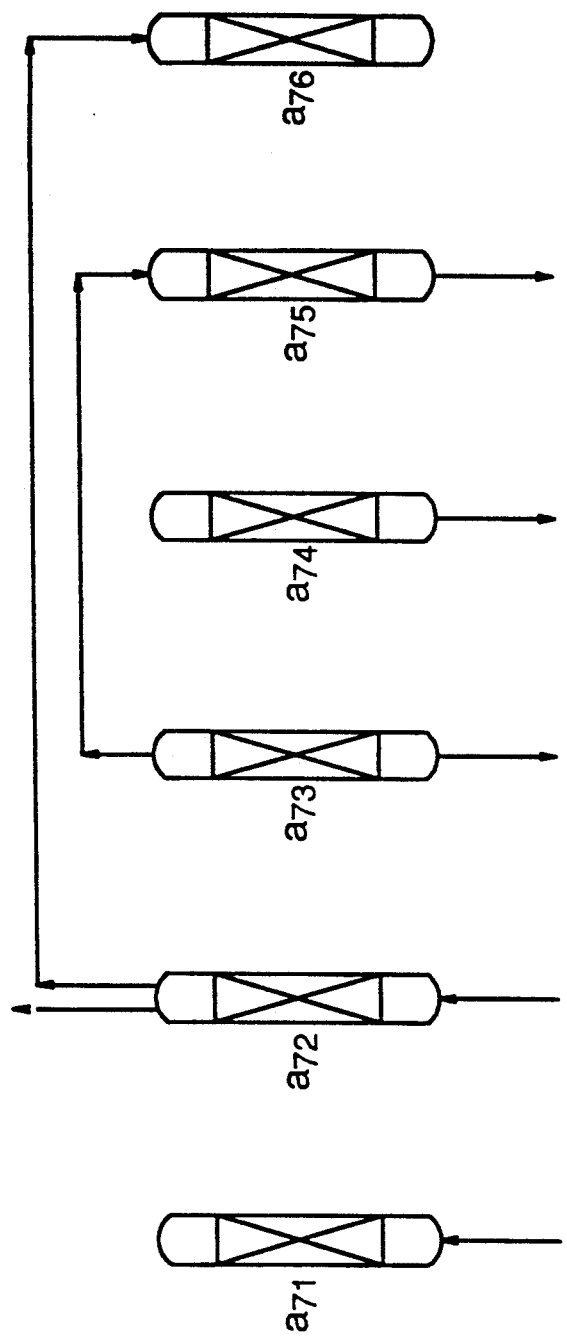
FIG. 7 is a series of schematic illustrations of an adsorption bed as it undergoes each step of the seventh embodiment of the present invention described in Table 7.

These steps are illustrated in FIG. 7 with regard to the first bed and illustrated as depicted in $a_{71}$ through $a_{76}$. The feed repressurization performed cocurrently is depicted in $a_{71}$. The first bed is then subjected to feed gas mixture introduction to adsorb more strongly adsorbable components and to produce a product of less strongly adsorbable components, as depicted in $a_{72}$. A portion of the product is used to product repressurize another bed undergoing what is illustrated for the first bed in $a_{76}$. The first bed is then subjected to cocurrent depressurization to provide purge gas, while simultaneously undergoing countercurrent venting, as depicted in $a_{73}$. The co-current depressurization gas for purge is supplied to another of the beds undergoing the same step, as depicted for the first bed in $a_{75}$. The first bed is then subjected to countercurrent evacuation as depicted in $a_{74}$ by connection to a source of vacuum, such as a vacuum pump. The bed then undergoes countercurrent vacuum purge as depicted in $a_{75}$ by connecting to a source of vacuum, such as a vacuum pump, while receiving cocurrent depressurization gas countercurrently from another bed undergoing the same step, as depicted for the first bed in $a_{73}$. Finally, the first bed is countercurrently product repressurized as depicted in $a_{76}$ with product repressurization gas provided from another of the beds undergoing the step depicted for the first bed in $a_{72}$. Optionally, product repressurization may be omitted and the first bed will undergo an idle step at $a_{76}$. Each bed undergoes the series of steps of $a_{71}$ through $a_{76}$, but in the interrelated time sequence as identified in Table 7.

Table 8 shows an alternative embodiment for a three bed system of the present invention using six steps for each bed. The steps in the table are feed gas mixture introduction to adsorb more strongly adsorbable components to produce a product of less strongly adsorbed components at the effluent end of the bed, identified as FEED > P; the feed gas mixture is then introduced into the adsorbent bed to produce product and repressurization gas, identified as FEED > PROD + REPRESS; followed by simultaneous cocurrent depressurization to provide purge gas while countercurrently venting, identified as PROV PUR/BLOWDOWN; next proceeding to a countercurrent evacuation, identified as EVACUATION; next proceeding to countercurrent vacuum purge using cocurrent depressurization gas from the second bed, identified as VAC PURGE; and ending with product repressurization using a portion of the product from the third bed identified as PRODUCT REPRESSURIZATION.

Figure 8:
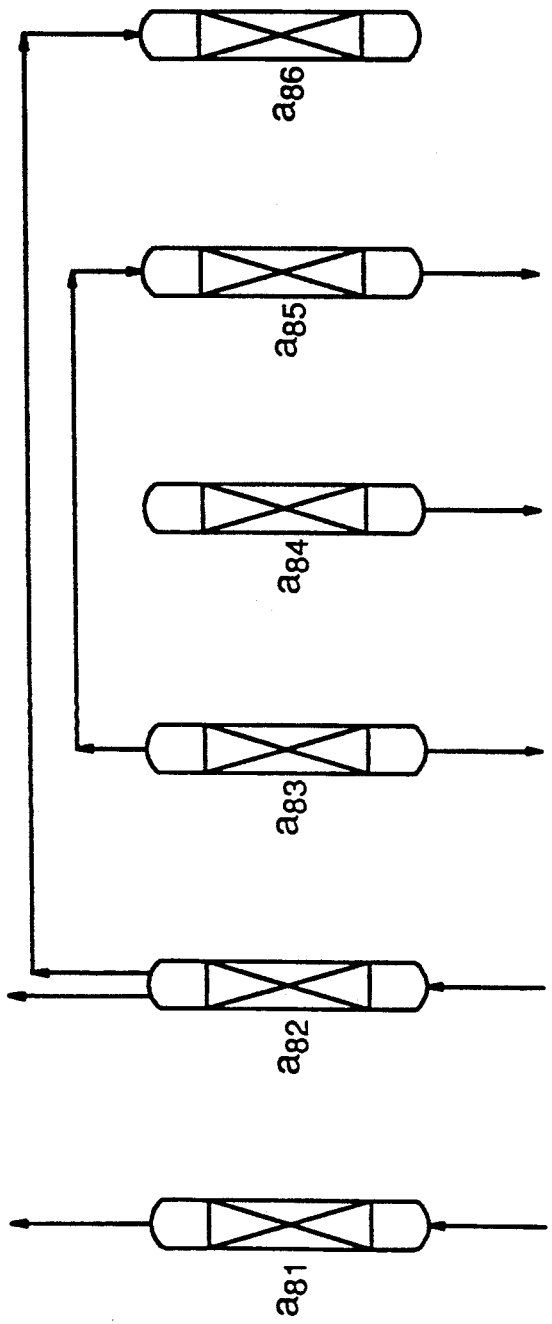
FIG. 8 is a series of schematic illustrations of an adsorption bed as it undergoes each step of the eighth embodiment of the present invention described in Table 8.

These steps are identified in FIG. 8 with regard to the series of steps that would be experienced in the first bed, although each bed in turn will experience the steps per the interrelationship identified in Table 8. In FIG. 8, the first bed has feed gas mixture introduced into it co-currently to adsorb more strongly adsorbed components and produce a product of less strongly adsorbable components at the effluent end of the bed, as depicted in $a_{81}$. Next, the first bed continues to have feed gas mixture introduced, but produces both product and product repressurization gas as depicted in $a_{82}$, a portion of the product repressurization gas can be provided to another of the three beds presently undergoing the step depicted for the first bed at $a_{86}$. The first bed is then simultaneously co-currently depressurized to provide purge gas while undergoing countercurrent vent, as depicted in $a_{83}$. The cocurrent depressurization gas for purge is supplied to another of the three beds currently undergoing the step depicted for the first bed in $a_{85}$. The first bed then undergoes countercurrent evacuation as depicted in $a_{84}$, while being connected to a source of vacuum, such as a vacuum pump. The regeneration of the bed is continued by countercurrent vacuum purging of the first bed as depicted in $a_{85}$ wherein cocurrent de-

TABLE 7

| FEED REPRESS | FEED PRODUCT | PROV PUR/BLOWDOWN |
|---|---|---|
| VAC PURGE | PROD REPRESS | FEED REPRESS |
| PROV PUR/BLOWDOWN | EVACUATION | VAC PURGE |
| EVACUATION | VAC PURGE | PROD REPRESS |
| FEED PRODUCT | PROV PUR/BLOWDOWN | EVACUATION |
| PROD REPRESS | FEED REPRESS | FEED PRODUCT |

The eighth cycle embodiment, employing 3 beds with solely product repressurization and no equalization steps, is depicted in Table 8. The cycle steps and sequence are identical to the 5 bed product repressurization embodiment with the exception that only one bed is on feed or under vacuum at a time so only 3 beds are needed. This embodiment is better than the corresponding 5 bed embodiment when unit power costs are low relative to capital equipment costs (smaller plants).

pressurization purge gas from another bed undergoing what is depicted for the first bed in $a_{83}$ is conducted into the first bed depicted in $a_{85}$ while being connected to the source of vacuum, such as the vacuum pump. The bed is then repressurized countercurrently with product gas as depicted in $a_{86}$ from a bed providing product repressurization gas undergoing a step comparable to that depicted for the first bed in $a_{82}$. Each bed undergoes the series of steps depicted in $a_{81}$ through $a_{86}$.

TABLE 8

| FEED > P | FEED > PROD + REPRESS | PROV PUR/BLOWDOWN | EVACUATION |
|---|---|---|---|
| VAC PURGE | PRODUCT REPRESSURIZATION | FEED > P | FEED > PROD + REPRESS |
| PROV PUR/BLOWDOWN | EVACUATION | VAC PURGE | PRODUCT REPRESSURIZATION |
| | | VAC PURGE | PRODUCT REPRESSURIZATION |

TABLE 8-continued

| | PROV PUR/ BLOWDOWN FEED > P | EVACUATION FEED > PROD + REPRESS |
|---|---|---|

Other variations on this cycle include different sorbent loading schemes tailored to specific gas mixtures including, but not limited to, hydrogen, nitrogen, methane, carbon monoxide, carbon dioxide and other light hydrocarbons.

An additional application for this basic cycle with a different sorbent loading is to recover oxygen from air.

Several fundamental ideas working synergistically allow this cycle to economically and efficiently generate the high product recoveries and purities. First, the feed and vacuum pumping steps are structured so that a constant number of beds are continuously receiving feed which eliminates the need for a feed surge tank. Also, a constant number of beds are continuously connected to the vacuum train which minimizes waste gas flow variations and permits stable operation of the vacuum pumping system. In addition, the combination of the countercurrent blowdown and cocurrent provide purge steps into a single dual ended step allows the feed and vacuum regeneration times to be maximized which, in turn, maximizes process efficiency.

Also, for embodiments one and three, there is a constant product flow throughout the cycle because of the advantageous design of the product assisted feed repressurization step. This allows the system to operate without a costly product surge tank used in conventional systems to stabilize product flow.

Finally, the ordering of the steps with the optional depressurization followed by the dual end blowdown/provide purge followed by evacuation and vacuum purge followed by the optional pressure equalization and finally followed by repressurization makes most efficient use of the void gas remaining in the beds after the flow of product stops. With this ordering, the gas with the lowest concentration of the less strongly adsorbed desired component is re-injected into the top of the bed during the vacuum purge step while progressively higher concentrations of the less strongly adsorbed species is re-injected into the bed as the bed approaches the time when it returns to the product generation steps. This deliberately increasing concentration of the less strongly component in the recycled gas which enters the product end of the column minimizes the recovery loss during the purge step, maximizes the product purity during the production steps, and maximizes the capacity of the bed by keeping the impurity front more toward the feed end of the bed.

In summary, it is the novel combination of all of these features into one cycle that permit the economical and efficient generation of the high product recoveries and purities.

A unique aspect of the present invention is the ordering of the optional pressure equalization step, the dual end blowdown/provide purge step, and the final repressurization step combined with the timing of these steps permits a constant number of beds to be continuously connected to the vacuum train while simultaneously permitting a constant number of beds to be continuously receiving feed. This combination of step order and timing also permits a more efficient use of the recycle gas to provide vacuum purge, pressure equalization, and repressurization compared with previous art. Furthermore, this combination provides for the maximum cycle time to be devoted to feed and evacuation, the most efficient production and regeneration parts of a vacuum swing adsorption purification cycle, which yields a further improvement over prior art. The dual end blowdown/provide purge step permits the removal of impure waste gas in the blowdown without passing it through the vacuum train and simultaneously permits a moderately pure stream of the desired component to be used as a source for the vacuum purge gas. Thus, it is not necessary to recycle valuable product to provide purge for the process which significantly improves the efficiency of the cycle. Finally, the design of options one and three permit constant product flow operation without employing the costly product surge tank routinely used in the conventional technology.

The present invention has been set forth with regard to several preferred embodiments. However, the full scope of the invention should be ascertained from the claims which follow:

We claim:

1. A process for selectively separating at least one more strongly adsorbable component(s) from a less strongly adsorbable component of a feed gas mixture in a plurality of adsorption beds containing an adsorbent selective for the more strongly adsorbable component(s), comprising the steps of:

(a) introducing a feed gas mixture at elevated pressure containing said more strongly adsorbable component(s) and said less strongly adsorbable component into an inlet of a first adsorption bed containing said adsorbent selective for the more strongly adsorbable component(s) and adsorbing the more strongly adsorbable component(s) on the adsorbent while the less strongly adsorbable component passes through said first bed unadsorbed until the adsorption front of the more strongly adsorbable component(s) approaches an outlet of said first bed and terminating the introduction of the feed gas mixture;

(b) cocurrently depressurizing said first bed to a lower pressure to remove said gas mixture from said first bed and passing said gas mixture to an outlet of another bed of said plurality of adsorption beds at lower pressure to countercurrently purge said more strongly adsorbable component(s) from the other bed under the influence of a vacuum, while simultaneously countercurrently venting said first bed;

(c) countercurrently evacuating said first bed under vacuum conditions to further remove said more strongly adsorbable component(s) at the lowest pressure;

(d) countercurrently purging said first bed with cocurrently depressurizing gas mixture from another bed of said plurality of adsorption beds undergoing step (b) to remove additional more strongly adsorbable component(s) from said first bed under the influence of vacuum;

(e) repressurizing said first bed; and (f) performing steps (a) through (e) in each of said plurality of adsorption beds in a phased sequence.

2. The process of claim 1 wherein said first adsorption bed is repressurized with feed gas mixture.

3. The process of claim 1 wherein said first adsorption bed is repressurized with less strongly adsorbable component.

4. The process of claim 1 wherein said first adsorption bed is repressurized with pressure feed gas mixture and with said less strongly adsorbable component.

5. The process of claim 1 wherein after the step (a) adsorption step the first bed is cocurrently depressurized to pressure equalize with another bed at a lower pressure.

6. The process of claim 5 wherein the first bed is simultaneously countercurrently depressurized to pressure equalize with another bed at a lower pressure while the first bed is cocurrently depressurized.

7. The process of claim 1 wherein after the step (d) purging, the first bed is at least partially repressurized by pressure equalization with another bed.

8. The process of claim 7 wherein after the step (a) adsorption, the first bed is cocurrently depressurized to supply pressure equalization gas for another bed.

9. The process of claim 1 wherein during the step (a) adsorption, less strongly adsorbable component is produced for a product and for repressurizing another bed.

10. The process of claim 9 wherein during step (a) adsorption, less strongly adsorbable component is produced for a product during a portion of the step (a) adsorption and less strongly adsorbable component is produced for a product and for repressurizing another bed simultaneously in another portion of the step (a) adsorption.

11. The process of claim 1 wherein between three and six parallel beds are utilized for said plurality of adsorption beds.

12. The process of claim 1 wherein said feed gas mixture is a hydrogen containing gas mixture, said more strongly adsorbable component(s) is selected from the group consisting of nitrogen, methane, carbon monoxide, carbon dioxide and mixtures thereof and said less strongly adsorbable component is hydrogen.

13. The process of claim 1 wherein multiple beds of said plurality of adsorption beds are performing step (a) adsorption at a given time during the process.

14. The process of claim 1 wherein multiple beds of said plurality of adsorption beds are performing step (c) evacuation at a given time during the process.

15. A process for selectively separating at least one more strongly adsorbable component(s) selected from the group consisting of nitrogen, methane, carbon monoxide, carbon dioxide and mixtures thereof from hydrogen in a hydrogen-containing feed gas mixture in a plurality of adsorption beds containing an adsorbent selective for the more strongly adsorbable component(s), comprising the steps of:

(a) introducing a hydrogen-containing feed gas mixture at elevated pressure containing said at least one more strongly adsorbable component(s) and said hydrogen into an inlet of a first adsorption bed containing said adsorbent selective for said at least one more strongly adsorbable component(s) and adsorbing a more strongly adsorbable component(s) on the adsorbent while the hydrogen passes through said first bed unadsorbed until the adsorption front of the more strongly adsorbable component(s) approaches an outlet of said first bed and terminating the introduction of said hydrogen-containing feed gas mixture;

(b) cocurrently depressurizing said first bed to a lower pressure to remove gas from said first bed and passing said gas to an outlet of another bed of said plurality of adsorption beds at lower pressure to countercurrently purge said more strongly adsorbable component(s) from the other bed under the influence of a vacuum, while simultaneously countercurrently venting said first bed;

(c) countercurrently evacuating said first bed under vacuum conditions to further remove said more strongly adsorbable component(s) at a lowest pressure;

(d) countercurrently purging said first bed with cocurrently depressurizing gas from another bed of said plurality of adsorption beds undergoing step (b) to remove additional more strongly adsorbable component from said first bed under the influence of a vacuum;

(e) repressurizing said first bed; and (f) performing steps (a) through (e) in each of said plurality of adsorption beds in a phased sequence.

16. The process of claim 15 wherein said hydrogen-containing feed gas mixture contains less than 60% hydrogen.

17. The process of claim 15 wherein said hydrogen-containing feed gas mixture is at a pressure less than 125 psig.

18. The process of claim 15 wherein said hydrogen-containing feed gas mixture contains more than 1% carbon monoxide or carbon dioxide.

19. The process of claim 15 wherein said adsorbent is selected from the group consisting of 13X-zeolite, 5A-zeolite, CaA-zeolite, activated carbon and mixtures thereof.

20. The process of claim 19 wherein the adsorbent is layered in the plurality of adsorbent beds with a layer of activated carbon near a feed end of each bed, a layer of 13X-zeolite, a layer of 5A-zeolite and a layer of CaA-zeolite.

21. The process of claim 15 wherein the hydrogen recovered from the process has a recovery of at least 80%.

22. The process of claim 15 wherein the hydrogen recovered from the process has a purity of at least 95%.

23. The process of claim 15 wherein the hydrogen-containing feed gas mixture is a refinery off gas.

24. A process for selectively separating at least one more strongly adsorbable component(s) selected from the group consisting of nitrogen, methane, carbon monoxide, carbon dioxide and mixtures thereof from hydrogen in a hydrogen-containing feed gas mixture in six parallel connected adsorption beds containing an adsorbent(s) selective for the more strongly adsorbable component(s), comprising the steps of:

(a) introducing a hydrogen-containing feed gas mixture at elevated pressure in the range of 5 to 125 psig containing said at least one more strongly adsorbable component(s) and said hydrogen into an inlet of a first adsorption bed containing said adsorbent(s) selective for said at least one more strongly adsorbable component(s) and adsorbing a more strongly adsorbable component(s) on the adsorbent while the hydrogen passes through said first bed unadsorbed as a product of at least 95% purity until the adsorption front of the more strongly adsorbable component(s) approaches an outlet of said first bed and terminating the introduction of said hydrogen-containing feed gas mixture;

(b) initially cocurrently depressurizing said first bed to a lower pressure to remove gas from said first bed and passing said gas to an outlet of another bed of said six adsorption beds at lower pressure to equalize the pressure in the two adsorption beds;

(c) further cocurrently depressurizing said first bed to a lower pressure to remove gas from said first bed and passing said gas directly to an outlet of a third bed of said six adsorption beds at a lowest pressure to countercurrently purge said more strongly adsorbable component(s) from said third bed under the influence of a vacuum, while simultaneously countercurrently venting said first bed;

(d) countercurrently evacuating said first bed under vacuum conditions to further remove said more strongly adsorbable component(s) to a lowest pressure in the range of 500 to 80 Torr absolute;

(e) countercurrently purging said first bed with cocurrently depressurizing gas from another bed of said plurality of adsorption beds undergoing step (c) to remove additional more strongly adsorbable component(s) from said first bed under the influence of a vacuum;

(f) initially repressurizing said first bed by passing gas from a bed undergoing step (b) initial cocurrent depressurization to pressure equalize the two beds;

(g) repressurizing said first bed with hydrogen-containing feed gas mixture; and (h) performing steps (a) through (g) in each of said six adsorption beds in a phased sequence.

25. The process of claim 24 wherein step (g) repressurization is performed with product hydrogen and hydrogen-containing feed gas mixture.

26. The process of claim 24 wherein step (b) pressure equalization is performed between the two beds by connecting their respective outlets and their respective inlets.

27. The process of claim 24 wherein each bed has an idle period between step (f) pressure equalization and step (g) repressurization.

* * * * *